United States Patent
Choi

(10) Patent No.: US 7,372,513 B2
(45) Date of Patent: May 13, 2008

(54) LIQUID CRYSTAL DISPLAY DEVICE AND METHOD FOR FABRICATING THE SAME

(75) Inventor: Woo Hyuk Choi, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 462 days.

(21) Appl. No.: 10/964,971

(22) Filed: Oct. 15, 2004

(65) Prior Publication Data

US 2005/0140836 A1 Jun. 30, 2005

(30) Foreign Application Priority Data

Dec. 30, 2003 (KR) .................. 10-2003-0101001
Sep. 30, 2004 (KR) .................. 10-2004-0077795

(51) Int. Cl.
*G02F 1/1368* (2006.01)
*G02F 1/1345* (2006.01)

(52) U.S. Cl. ................ 349/40; 349/43; 349/147

(58) Field of Classification Search ........... 349/40, 349/42, 43, 147, 148, 149, 152; 257/355, 257/356, 59, 72; 361/56, 58, 91.1
See application file for complete search history.

(56) References Cited

U.S. PATENT DOCUMENTS 6,927,420 B2 * 8/2005 Kim ........................ 257/72
2004/0027502 A1 * 2/2004 Tanaka et al. ............ 349/40

* cited by examiner

*Primary Examiner*—Toan Ton
*Assistant Examiner*—Tai Duong
(74) *Attorney, Agent, or Firm*—Morgan, Lewis & Bockius LLP

(57) ABSTRACT

An liquid crystal display device having an electrostatic prevention circuit by using a diffraction exposure, and a method for fabricating the same are disclosed in the present invention. The liquid crystal display includes a substrate having a display area and a non-display area; a data line disposed along a first direction on the substrate and having a metal layer and a semiconductor layer; a gate line disposed along a second direction crossing the data line, defining a pixel region; a common voltage line on the non-display area; pixel electrodes at each pixel region; a first electrostatic prevention pattern electrically connected between the gate line and the common voltage line; and a second electrostatic prevention pattern electrically connected between the data line and the common voltage line.

22 Claims, 19 Drawing Sheets

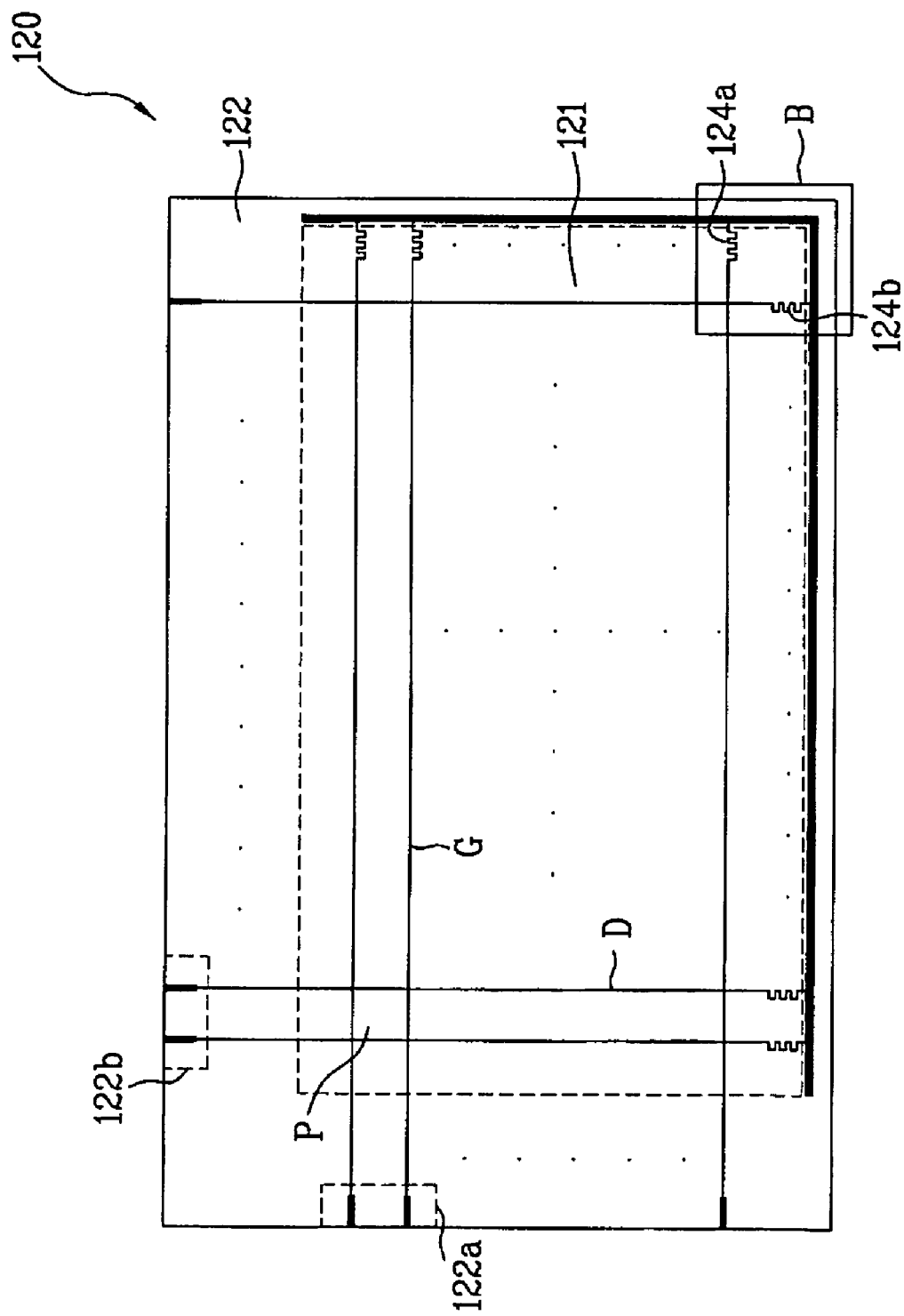

FIG. 7
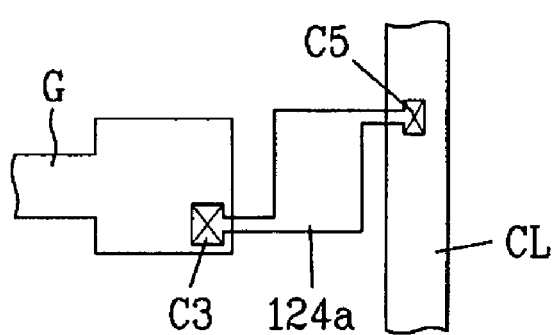
(a)
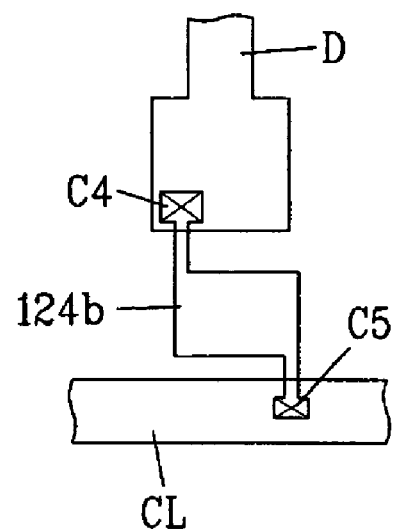
(b)

LIQUID CRYSTAL DISPLAY DEVICE AND METHOD FOR FABRICATING THE SAME

This application claims the benefit of the Korean Application No. P2003-101001 filed on Dec. 30, 2003, and No. P2004-0077795 filed on Sep. 30, 2004, which are hereby incorporated by reference.

BACKGROUND OF THE INVENTION

1. Field of the Invention

The present invention relates to a liquid crystal display (LCD) device, and more particularly, to an LCD device having an electrostatic prevention circuit and a method for fabricating the same by using a diffraction exposure process.

2. Discussion of the Related Art

Demands for various display devices have increased with the development of information society. Accordingly, many efforts have been made to research and develop various types of flat display devices, such as liquid crystal display (LCD), plasma display panel (PDP), electroluminescent display (ELD), and vacuum fluorescent display (VFD). Some types of flat display devices have already been used as displays in various applications.

Among the types of flat display devices, liquid crystal display (LCD) devices have been most widely used due to advantageous characteristics of thin profile, lightness in weight, and low power consumption, whereby the LCD devices provide a substitute for a Cathode Ray Tube (CRT). In addition to mobile type LCD devices such as a display for a notebook computer, LCD devices have been developed for computer monitors and televisions to receive and display broadcasting signals.

Despite various technical developments in the LCD technology having applications in different fields, research in enhancing the picture quality of the LCD device has been, in some respects, lacking as compared to other features and advantages of the LCD device. In order to use LCD devices in various fields as a general display, the key to developing LCD devices depends on whether LCD devices can realize a high quality picture, such as high resolution and high luminance with a large-sized screen, while still maintaining lightness in weight, thin profile, and low power consumption.

In general, the LCD device includes an LCD panel for displaying an image and a driver for supplying a driving signal to the LCD panel. In addition, the LCD panel includes first and second substrates bonded to each other. A liquid crystal layer is positioned in a cell gap between the first and second substrates. The first substrate (referred to as a TFT array substrate) includes a plurality of gate lines arranged along a first direction at fixed intervals, a plurality of data lines arranged along a second direction perpendicular to the first direction at fixed intervals, a plurality of pixel electrodes arranged in a matrix-type configuration within pixel regions defined by the gate and data lines, and a plurality of thin film transistors transmit signals from the data lines to the pixel electrodes in accordance with signals supplied to the gate lines. The second substrate (referred to as a color filter array substrate) includes a black matrix layer that prevents a light leakage from portions of the first substrate except at the pixel regions, an R/G/B color filter layer for displaying various colors, and a common electrode for producing an image. Alignment layers are respectively formed on opposing surfaces of the first and second substrates, wherein the alignment layers are rubbed to align the liquid crystal layer. Then, the first and second substrates are bonded together by a sealant, and liquid crystal is injected between the first and second substrates.

In the fabrication process of the aforementioned LCD device, the LCD device may be damaged due to static electricity. That is, since the static electricity applies high energy to the LCD device in a short time (in several tens nanoseconds), the LCD device may be damaged. Static electricity has different characteristics depending on the generation source of the electricity. There are different static electricity generations including HBM (human body model), MM (machine model), and CDM (charged device model). Based on these models, electrostatic prevention circuits have been actively developed.

The HBM is modeled on the case of the static electricity induced by the human body. The MM is modeled on the static electricity generated when electric charges of a transport machine or a box are discharged to the LCD panel. The CDM is modeled on the case of static electricity being charged to the LCD panel by electricity generated by friction during the transport or when the LCD panel is touched to a socket or a conductor during the fabrication. Specific portions of the substrate of the LCD panel, used as paths of electricity discharge, are damaged due to such static electricity discharges.

Accordingly, it is prudent to provide an electrostatic prevention circuit inside the LCD device such that internal components of the LCD device are protected from the static electricity. That is, the electrostatic prevention circuit protects the LCD device from static electricity. Also, while driving the LCD device under normal circumstances, the electrostatic prevention circuit should not interfere with or disturb driving signals. Accordingly, the electrostatic prevention circuit should have low impedance in a high voltage state and high impedance in a low voltage state.

Hereinafter, an LCD device having an electrostatic prevention circuit according to the related art will be described with reference FIG. 1 and FIG. 2.

FIG. 1 is a schematic view of a substrate for an LCD device having an electrostatic prevention circuit according to the related art.

As shown in FIG. 1, a substrate 40 (TFT array substrate) includes a plurality of gate G and data D lines crossing each other, a plurality of pixel regions P defined by the gate and data lines G and D formed in a display area 21 of the substrate 40, a plurality of pixel electrodes formed in the pixel regions P, a thin film transistor (not shown) formed in a crossing portion of the gate line G and the data line D, a common voltage line CL formed in a non-display area 22 surrounding the display area 21, and an electrostatic prevention circuit 24 electrically connected between the gate line G (or the data line D) and the common voltage line CL. That is, the common voltage line CL serves as a transmission line for transmitting common voltage to a common electrode. For that, the common voltage line CL is electrically connected with the common electrode (not shown) formed on another substrate (color filter substrate) by the medium of Ag dot. Also, liquid crystal is formed between the substrate 40 (TFT array substrate) and another substrate (color filter substrate).

During the state of a normal driving voltage, the electrostatic prevention circuit 24 serves as a sufficiently large resistance so as to have no effect on the internal driving of the thin film transistor of the substrate 40. During the state of an overvoltage generated by static electricity applied to the substrate 40, that is, to the gate lines G or data lines D, the electrostatic prevention circuit 24 functions as a discharge path. This will be described with reference to the accompanying drawings.

FIG. 2 is an expanded view of portion 'A' of FIG. 1. FIG. 3 is an equivalent circuit view of FIG. 2.

As shown in FIG. 2 and FIG. 3, the electrostatic prevention circuit 24 is comprised of first to third transistors T1 to T3. That is, the first transistor Ti has a gate terminal and a source terminal connected to the gate line G. The second transistor T2 has a gate terminal and a drain terminal connected to the common voltage line CL, and a source terminal connected to a drain terminal of the first transistor T1. The third transistor T3 has a gate terminal connected to a common terminal formed by connecting the drain terminal of the first transistor T1 and the source terminal of the second transistor T2, a source terminal connected to the gate line G, and a drain terminal connected to the common voltage line CL.

On driving the LCD device under the normal circumstances, the driving voltage applied to the thin film transistor through the common voltage line CL and the gate line G is lower than the driving voltage of the electrostatic prevention circuit 24 comprised of the first to third transistors (T1 to T3), so that the electrostatic prevention circuit 24 is turned off. As a result, the electrostatic prevention circuit 24 has no effect on driving the thin film transistor. However, if the static electricity of the high voltage above the driving voltage of the thin film transistor is applied to the gate line G, the static electricity is discharged to the common voltage line CL through the electrostatic prevention circuit 24. Accordingly, an equipotential generates between the gate line G and the common voltage line CL. Meanwhile, the electrostatic prevention circuit 24 connected between the data line D and the common voltage line CL has the same structure as that of the electrostatic prevention circuit 24 connected between the gate line G and the common voltage line CL. As described above, the static electricity of the data line D is discharged to the common voltage line CL according to the same method.

At this time, the thin film transistor and the first to third transistors (T1 to T3) of the electrostatic prevention circuit 24 are formed by photolithography using a plurality of masks. Recently, a 4-mask or 3-mask process using a diffraction exposure method and a lift-off method is generally used to improve yield of the thin film transistor, which substitutes for the conventional 5-mask process. As described above, in case of using the 4-mask process or 3-mask process, it is possible to decrease the usage number of the masks. However, in the 4-mask process or 3-mask process, it has the problem in deterioration of the uniformity, after ashing a photoresist, when performing an etching process for removing a metal layer and a doped semiconductor layer for channel region of the exposed thin film transistor by using the ashed photoresist as a mask.

This will be described in detail by the process (4-mask process using the diffraction exposure) of the thin film transistor.

FIG. 4A to FIG. 4G are cross sectional views of explaining the fabrication process steps of the thin film transistor using the diffraction exposure method according to the related art.

First, as shown in FIG. 4A, a metal layer is deposited on an entire surface of the substrate 40, and selectively patterned by photolithography, thereby forming a gate electrode GE, a first storage electrode ST1, and the common voltage line CL (not shown), at the same time (a first mask).

Subsequently, as shown in FIG. 4B, a gate insulating layer GI of an insulating material such as silicon oxide $SiO_x$ or silicon nitride $SiN_x$, a semiconductor material 41 of genuine amorphous silicon, a doped semiconductor material 42 of amorphous silicon with dopants, and a metal layer 43 of chrome (Cr) or molybdenum (Mo) are sequentially deposited on the entire surface of the substrate 40 including the gate electrode GE, the first storage electrode ST1, and the common voltage line CL.

Next, as shown in FIG. 4C, a photoresist PR is coated on the entire surface of the metal layer 43, and then the coated photoresist PR is patterned by selective exposure through a diffraction mask M and development. At this time, the diffraction mask M includes an open part m1 penetrating light, a closed part m2 cutting off the light, and a diffraction part m3 comprised of a slit allowing to pass a part of the light and cutting off a part of the light. The diffraction part m3 corresponds to the channel region of the thin film transistor.

When performing the exposure and development process to the photoresist PR by irradiating ultraviolet ray through the diffraction mask M, the photoresist PR corresponding to the open part m1 is removed, the photoresist PR corresponding to the closed part m2 remains as it is, and the photoresist PR corresponding to the diffraction part m3 is removed at a predetermined thickness.

Generally, the photoresist PR corresponding to the diffraction part m3 is formed to have a half of the initial thickness.

After that, the exposed metal layer 43, the doped semiconductor material of amorphous silicon with dopants 42, and the semiconductor material of intrinsic amorphous silicon 41 are removed by the etching process using the patterned photoresist PR as the mask. As a result, a first semiconductor layer 41a, a first ohmic contact layer 42a, and a source/drain metal layer 44 are formed on the gate insulating layer GI above the gate electrode GE. At this time, a second semiconductor layer 41b, a second ohmic contact layer 42b, and a second storage electrode ST2 are formed on the gate insulating layer GI above the first storage electrode ST1 (a second mask).

Then, as shown in FIG. 4D, the patterned photoresist PR is ashed by a plasma process.

The entire surface of the patterned photoresist PR is ashed at the same level by the ashing step. At this time, the photoresist PR corresponding to the diffraction part m3 is removed because the photoresist PR corresponding to the diffraction part m3 has less thickness for the other parts of the photoresist PR. Accordingly, the source/drain metal layer 44 corresponding to the diffraction part m3 is exposed.

Subsequently, the exposed source/drain metal layer 44, and the ohmic contact layer formed under the source/drain metal layer 44 are simultaneously etched by using the photoresist PR remaining after the ashing step as the mask. Thus, as shown in FIG. 4E, a channel region is formed by exposure of the first semiconductor layer 41a, and then the photoresist PR is removed. At this time, a source electrode SE overlapping one edge of the first semiconductor layer 41a, and a drain electrode DE overlapping the other edge of the first semiconductor layer 41a are formed as the source/drain metal layer 44 separates.

Referring to FIG. 4F, a passivation layer 45 of an organic insulating material is deposited on the entire surface of the substrate 40 including the source electrode SE, the drain electrode DE, the second storage electrode ST2, and the gate insulating layer GI, and then selectively patterned by photolithography, thereby forming a drain contact hole C1, and a storage contact hole C2. At this time, the drain contact hole C1 exposes some of the drain electrode DE, and the storage contact hole C2 exposes some of the second storage electrode ST2.

Then, as shown in FIG. 4G, a transparent conductive layer is deposited on the entire of the substrate 40 including the passivation layer 45, and then selectively patterned by photolithography, thereby forming a pixel electrode 46 in the pixel region P, wherein the pixel electrode 46 connects the drain electrode DE with the second storage electrode ST2 through the drain contact hole C1 and the storage contact hole C2.

Meanwhile, although not shown, the first to third transistors T1 to T3 of the electrostatic prevention circuit are manufactured by the same process as that of the thin film transistor of the display area 21. By the ashing step shown in FIG. 4C and FIG. 4E, when removing the photoresist PR formed in the channel region of the first to third transistors T1 to T3, it has a problem in that the thickness of the photoresist PR is not uniform. Accordingly, it causes deterioration in the uniformity in the etching process for removing the source/drain metal layer 44 of the channel region and the first ohmic contact layer 42a, whereby it may generate an under-etch or over-etch problems. In case of the under-etch, the channel region is not less etched, so that the first ohmic contact layer 42a of the channel region is not removed. Meanwhile, in case of the over-etch, the channel region is etched excessively, whereby the first semiconductor layer 41a positioned under the first ohmic contact layer 42a is etched. Accordingly, due to the under-etch and the over-etch problems, the thin film transistor loses the function of a switching device. As a result, even though the voltage above the driving voltage is applied to each gate line G and data line D according as static electricity generates in the inside of the LCD device, it is impossible to discharge the static electricity by using the related art electrostatic prevention circuit.

SUMMARY OF THE INVENTION

Accordingly, the present invention is directed to an LCD device and a method for fabricating the same that substantially obviates one or more problems due to limitations and disadvantages of the related art.

An object of the present invention is to provide an LCD device and a method for fabricating the same, to form an electrostatic prevention pattern in a 4-mask process or 3-mask process using a diffraction exposure method with an electrostatic prevention pattern of a transparent conductive layer in a zigzag type, instead of a related art electrostatic prevention circuit comprised of a plurality of transistors.

Additional features and advantages of the invention will be set forth in the description which follows, and in part will become apparent from the description or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a liquid crystal display (LCD) device includes a substrate having a display area and a non-display area; a data line disposed along a first direction on the substrate and having a metal layer and a semiconductor layer; a gate line disposed along a second direction crossing the data line, to defining a pixel region; a common voltage line on the non-display area; pixel electrodes at each pixel regions; a first electrostatic prevention pattern electrically connected between the gate line and the common voltage line; and a second electrostatic prevention pattern electrically connected between the data line and the common voltage line.

In another aspect of the present invention, a liquid crystal display (LCD) device includes a substrate having display area and a non-display area; a data line disposed along a first direction on the display area of the substrate and having a metal layer and a semiconductor layer; a gate line along a second direction crossing the data line, to defining a pixel region; a common voltage line on the non-display area; pixel electrodes at each pixel regions; a first electrostatic prevention pattern electrically connected between the gate line and the common voltage line; a second electrostatic prevention pattern electrically connected between the data line and the common voltage line; and a passivation layer formed on an entire surface of the substrate except the pixel electrode, the first electrostatic prevention pattern, and the second electrostatic prevention pattern.

In another aspect of the present invention, a method for fabricating a liquid crystal display (LCD) device includes the steps of preparing a substrate having a display area and a non-display area; forming a plurality of gate lines, each having a gate electrode, in the display area, and forming a common voltage line in the non-display area; sequentially forming a gate insulating layer, a semiconductor layer, a doped semiconductor layer, a metal layer, and a photoresist on an entire surface of the substrate including the gate line and the common voltage line; forming a photoresist pattern having the different thickness by diffraction exposure of the photoresist; forming a plurality of data lines crossing the gate lines by removing the exposed semiconductor layer, the doped semiconductor layer, and the metal layer in state of using the photoresist pattern as a mask; exposing the metal layer formed on a channel region of a thin film transistor by ashing the photoresist pattern; forming source/drain electrodes of the thin film transistor by etching the exposed metal layer and the doped semiconductor layer in state of using the ashed photoresist pattern as a mask; forming a passivation layer on the entire surface of the substrate including the source/drain electrodes, and forming first, second, third, and fourth contact holes for respectively exposing the drain electrode, the end of the gate line, the end of the data line, and the common voltage line; and forming a pixel electrode in the pixel region to be connected with the drain electrode through the first contact hole, a first electrostatic prevention pattern electrically connected with the end of the gate line and the common voltage line through the second and fourth contact holes, and a second electrostatic prevention pattern electrically connected with the end of the data line and the common voltage line through the third and fourth contact holes.

In another aspect of the present invention, a method for fabricating a liquid crystal display (LCD) device includes the steps of preparing a substrate having a display area and a non-display area; forming a plurality of gate lines, each having a gate electrode, in the display area, and forming a common voltage line in the non-display area; sequentially forming a gate insulating layer, a semiconductor layer, a doped semiconductor layer, a metal layer, and a first photoresist on an entire surface of the substrate including the gate line and the common voltage line; forming a first-photoresist pattern having the different thickness by diffraction exposure of the first photoresist; forming a plurality of data lines crossing the gate lines by removing the semiconductor layer, the doped semiconductor layer, and the metal layer in state of using the first photoresist pattern as a mask;

exposing the metal layer formed on a channel region of a thin film transistor by ashing the first photoresist pattern; forming source/drain electrodes of the thin film transistor by etching the exposed metal layer and the doped semiconductor layer in state of using the ashed first photoresist pattern as a mask; forming a passivation layer on the entire surface of the substrate including the source/drain electrodes; forming a second photoresist on the entire surface of the substrate including the passivation layer, and forming a second photoresist pattern by selectively exposing the second photoresist; exposing the pixel region, the drain electrode, the end of the gate line, the end of the data line, and the common voltage line by removing the exposed passivation layer in state of using the second photoresist pattern as a mask; forming a transparent conductive layer on the entire surface of the substrate including the second photoresist pattern, the pixel region, the drain electrode, the end of the gate line, the end of the data line, and the common voltage line; and forming a pixel electrode in the pixel region to be connected with the drain electrode, a first electrostatic prevention pattern electrically connected with the end of the gate line and the common voltage line, and a second electrostatic prevention pattern electrically connected with the end of the data line and the common voltage line, by removing the second photoresist pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a schematic view of a substrate for an LCD device according to a first embodiment of the present invention.

FIG. 7 is a schematic view for explaining the shape of first and second electrostatic prevention patterns when static electricity generates.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device according to preferred embodiments of the present invention will be described with reference to the accompanying drawings.

Figure 1:
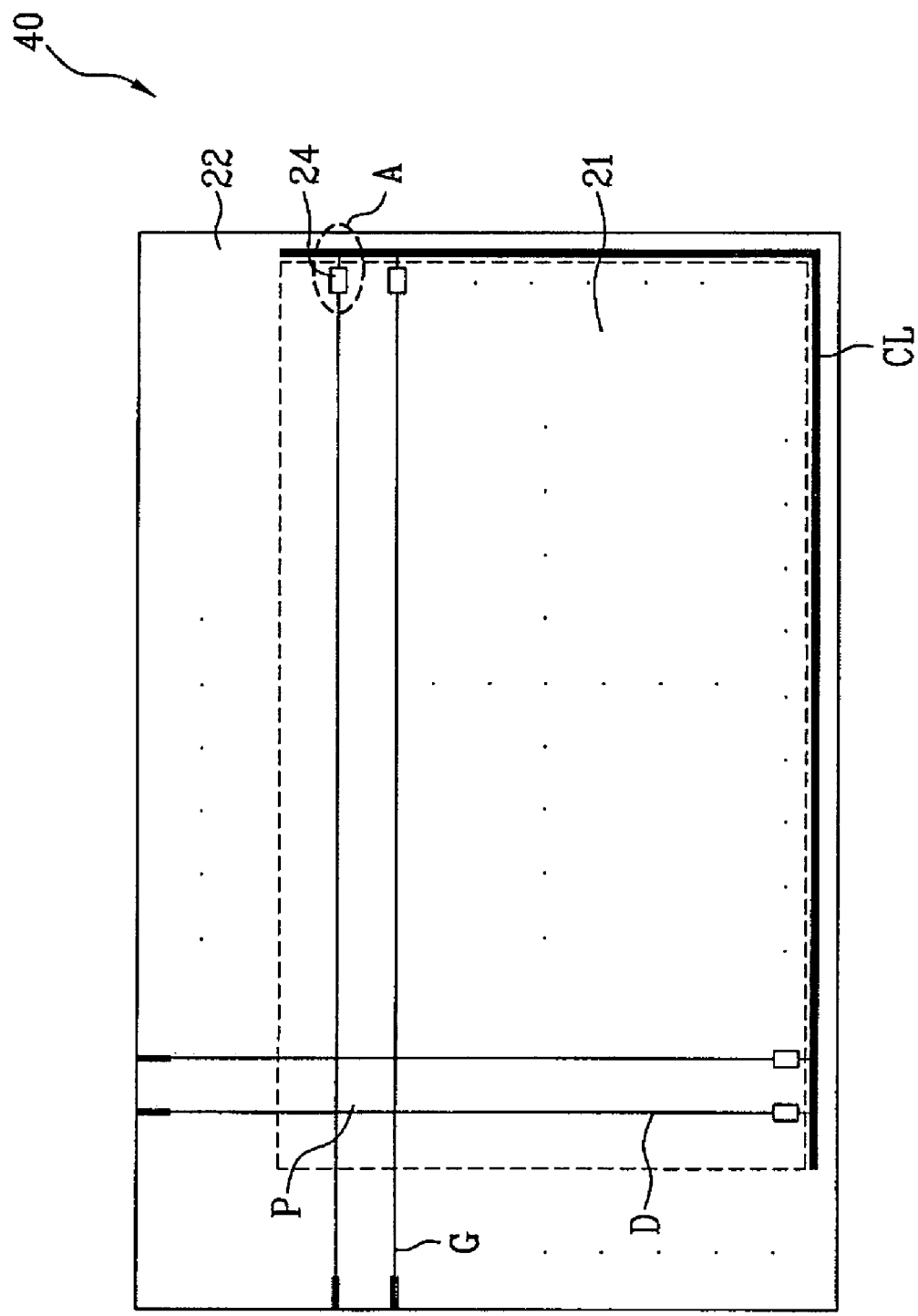
FIG. 1 is a schematic view of a substrate for an LCD device having an electrostatic prevention circuit according to the related art.
Figure 2:
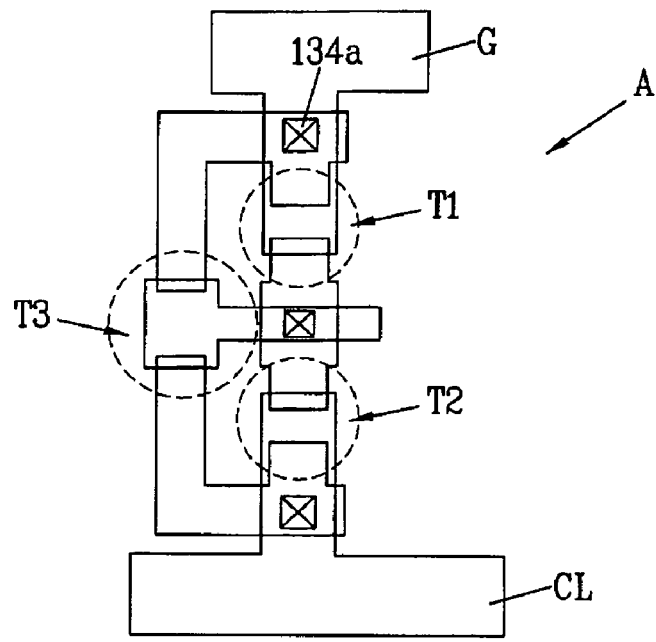
FIG. 2 is an expanded view of portion 'A' in FIG. 1.
Figure 3:
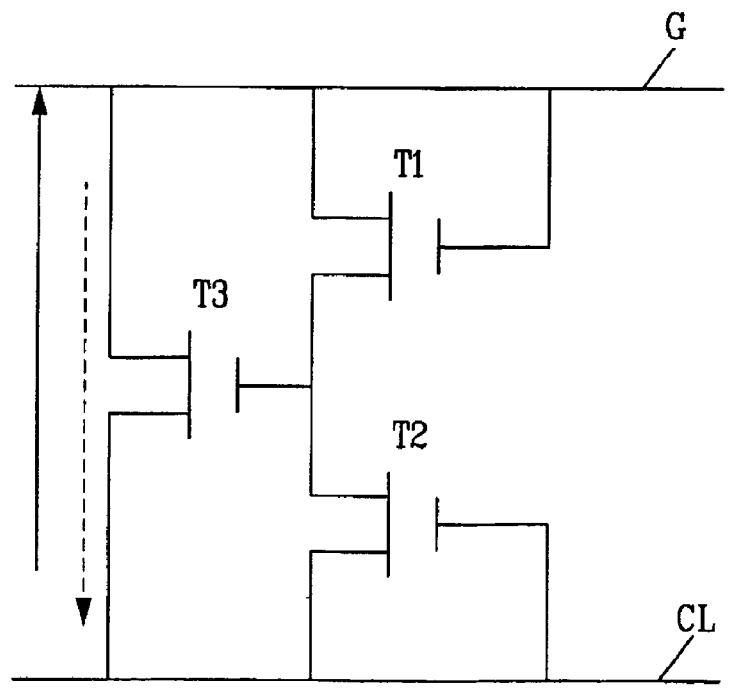
FIG. 3 is an equivalent circuit view of FIG. 2.
Figure 4A:
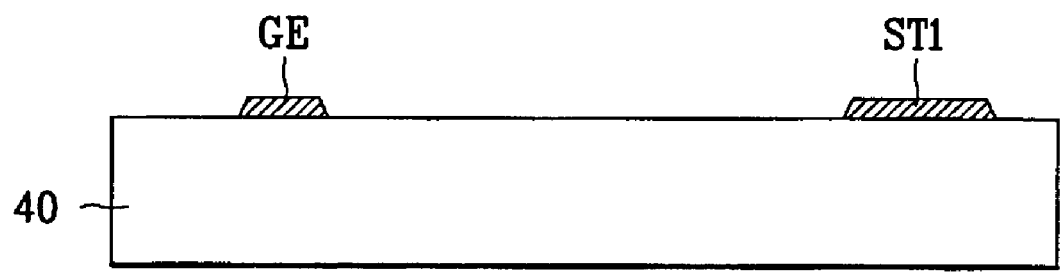
FIG. 4A to FIG. 4G are cross sectional views for explaining the fabrication process steps of a thin film transistor using a diffraction exposure method according to the related art.
Figure 4B:
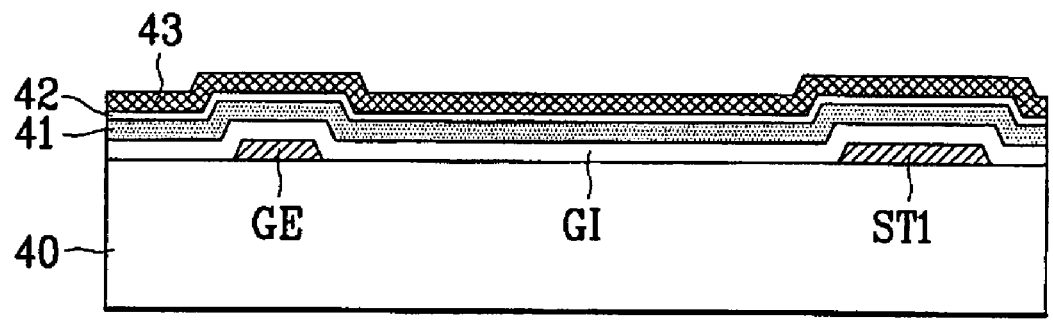
Figure 4C:
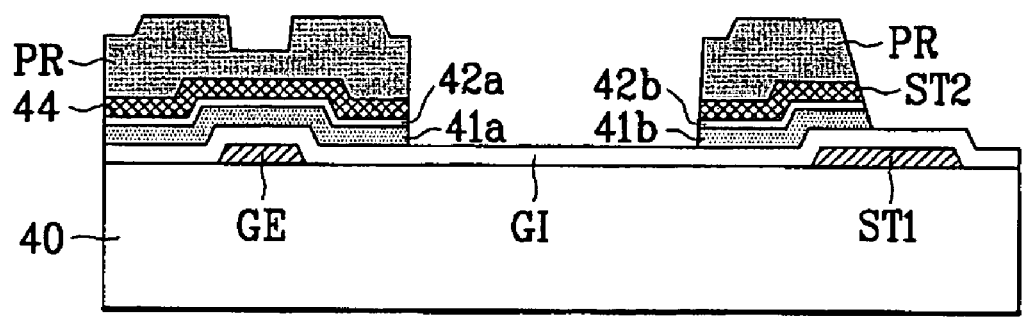
Figure 4D:
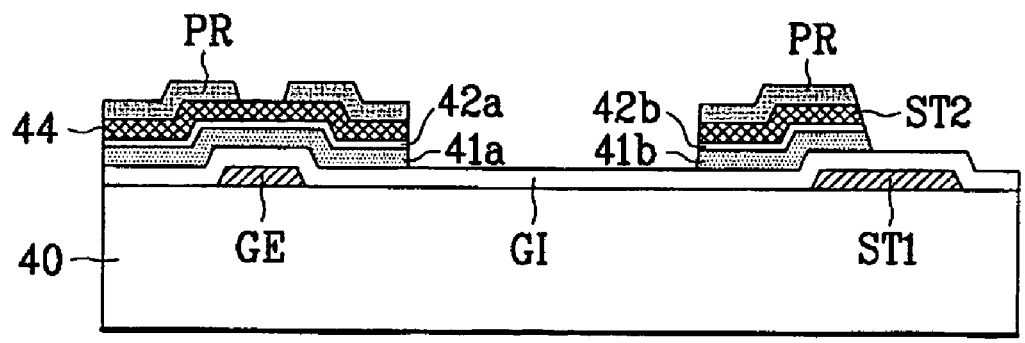
Figure 4E:
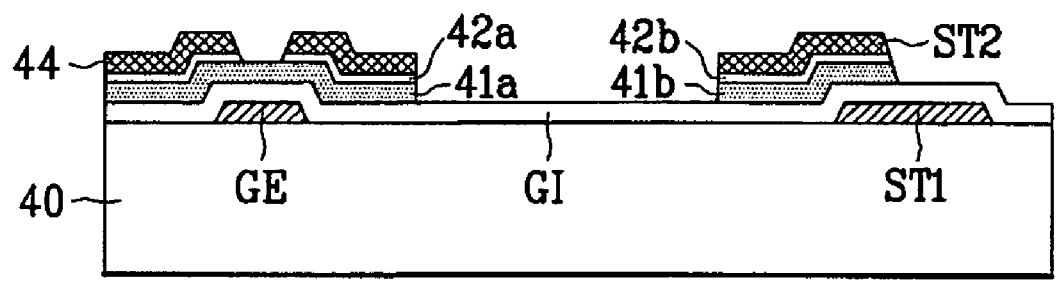
Figure 4F:
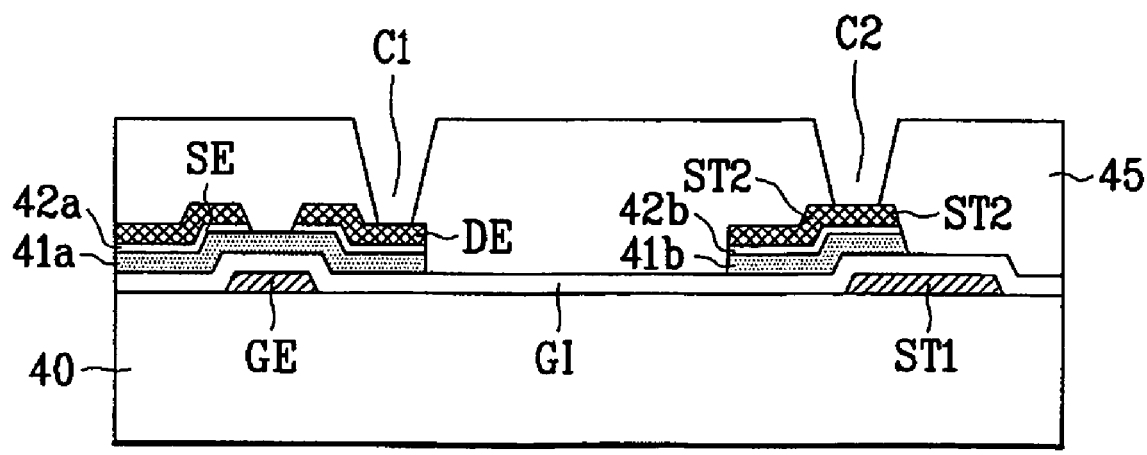
Figure 4G:
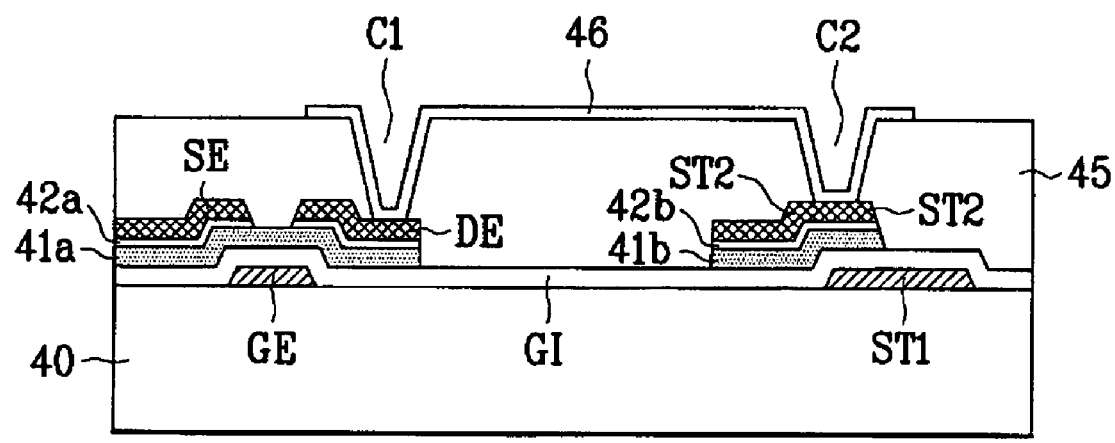
Figure 6:
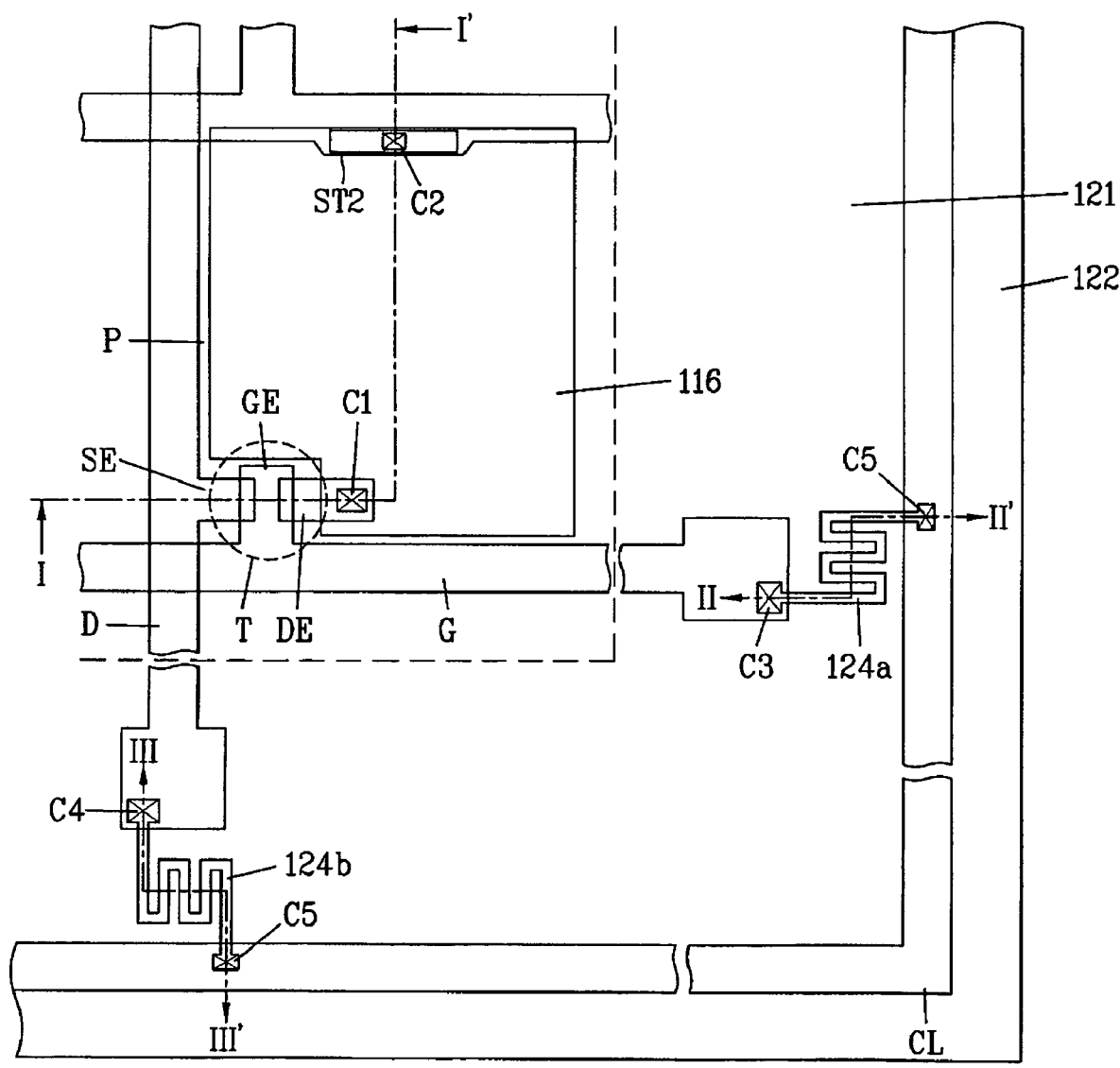
FIG. 6 is a schematic view of portion 'B' in FIG. 5 according to the first embodiment of the present invention.

FIG. 5 is a schematic view of a substrate for an LCD device according to a first embodiment of the present invention. FIG. 6 is a schematic view of portion 'B' in FIG. 5 according to the first embodiment of the present invention. FIG. 7 is a view for explaining the shape of first and second electrostatic prevention patterns when static electricity generates.

As shown in FIG. 5 and FIG. 6, a substrate (TFT array substrate) 100 of an LCD device according to the first embodiment of the present invention includes a plurality of data lines D arranged along a first direction on the substrate 100, each data line D having a deposition structure of a semiconductor layer (not shown) and a metal layer (not shown), a plurality of gate lines G arranged along a second direction in perpendicular to the data lines D of the substrate 100, to define a plurality of pixel regions P in a display area 121 of the substrate 100, a common voltage line CL formed in a non-display area 122 surrounding the display area 121, a first electrostatic prevention pattern 124a electrically connected between the gate line G and the common voltage line CL, and a second electrostatic prevention pattern 124b electrically connected between the data line D and the common voltage line CL.

Also, a thin film transistor T is formed at a crossing portion of the gate line G and the data line D of the substrate 100. In addition, a pixel electrode 116 is formed in the pixel region P, wherein the pixel electrode 116 receives a data voltage from the data line D when the thin film transistor T is turned-on. Then, the non-display area 122 of the substrate 100 includes a plurality gate pads 122a to which one end of the gate line G is connected, and a plurality data pads 122b to which one end of the data line D is connected. The other end of the gate line G is connected to one end of the first electrostatic prevention pattern 124a, and the other end of the data line D is connected to one end of the second electrostatic prevention pattern 124b.

Although not shown, another substrate (color filter array substrate) is provided above the substrate (TFT array substrate) 100, wherein the two substrates are opposite to each other. The substrate (color filter array substrate) includes a black matrix layer that prevents a light leakage from portions except for the pixel regions P, an R/G/B color filter layer for displaying various colors, and a common electrode for producing an image. The common electrode is electrically connected with the common voltage line CL of the substrate 100 (TFT array substrate) by the medium of Ag dots.

Then, the substrate 100 (TFT array substrate) and another substrate (color filter array substrate) are bonded to each other by a sealant in state of having a predetermined interval therebetween by a spacer, and a liquid crystal layer is formed between the two substrates.

Meanwhile, the first electrostatic prevention pattern 124a is formed in a zigzag type, so that the first electrostatic prevention pattern 124 is longer than the shortest distance between the gate line G and the common voltage line CL. Also, the second electrostatic prevention pattern 124b is formed in a zigzag type, so that the second electrostatic prevention pattern 124b is longer than the shortest distance between the data line D and the common voltage line CL. That is, the first electrostatic prevention pattern 124a and the second electrostatic prevention pattern 124b are formed of a plurality of horizontal parts, and a plurality of vertical parts, wherein the plurality of vertical parts are alternately connected to both ends of the horizontal parts. As a result, the first and second electrostatic prevention patterns 124a and 124b are formed in shape of 'ㄹ'. In addition, the first electrostatic prevention pattern 124a and the second electrostatic prevention pattern 124b may be formed in one of shapes of 'S', 'Z', notch, saw-tooth, or chevron. At this time, the first and second electrostatic prevention patterns 124a and 124b are formed of the same material as that of the pixel electrode 116, that is, a transparent conductive layer having a great surface resistance, such as ITO (indium-tin-oxide).

Herein, the first and second electrostatic prevention patterns 124a and 124b are formed in the zigzag type, and are formed of the transparent conductive layer, whereby the first and second electrostatic prevention patterns 124a and 124b have a high resistance. Accordingly, in driving the LCD device under the normal circumstances, it is possible to prevent the interference between signals of the gate line G and the data line D and a common signal of the common voltage line CL.

However, if the externally generated static electricity generated in the external penetrates into the inside of the substrate 100, and is applied to the gate line G or the data line D, the static electricity is discharged to the common voltage line CL through the first and second electrostatic prevention patterns 124a and 124b. Then, an equipotential generates between the common line CL and the gate line G due to the high voltage of the discharged static electricity, so that there is no voltage difference between the common voltage line CL and the gate line G. Also, an equipotential generates between the common line CL and the data line D due to the high voltage of the discharged static electricity, so that there is no voltage difference between the common voltage line CL and the data line D. Accordingly, it is possible to prevent various components such as the thin film transistor T inside the substrate 100 from being damaged by the static electricity.

Also, if the intensity of the static electricity applied to the gate line G and the data line D becomes greater, the first and second electrostatic prevention patterns 124a and 124b are oxidized and melt by the high voltage static electricity. At this time, as shown in (a) of FIG. 7, the vertical and horizontal parts in the first electrostatic prevention pattern 124a are melted and connected to each other. Also, as shown in (b) of FIG. 7, the vertical and horizontal parts in the second electrostatic prevention pattern 124b are melted and connected to each other.

As each size of the first and second electrostatic prevention patterns 124a and 124b increases, each resistance in the first and second electrostatic prevention patterns 124a and 124b becomes low. As a result, the high voltage of the static electricity is discharged to the common voltage line CL through the first and second electrostatic prevention patterns 124a and 124b having a low resistance.

As compared with the related art of a complicated structure including a transistor with a channel region, the first and second electrostatic prevention patterns 124a and 124b according to the present invention have a simple structure. Thus, it is possible to eliminate under-etch and over-etch problems of the channel region generated in 4-mask process using a diffraction exposure method according to the related art.

A method for fabricating the LCD device according to the embodiment of the present invention will be described as follows.

FIG. 8A to FIG. 8G are cross sectional views for explaining the fabrication process steps of a thin film transistor-and an electrostatic prevention circuit in an LCD device along I-I', II-II', and III-III' according to the first embodiment of the present invention.

Figure 8A:
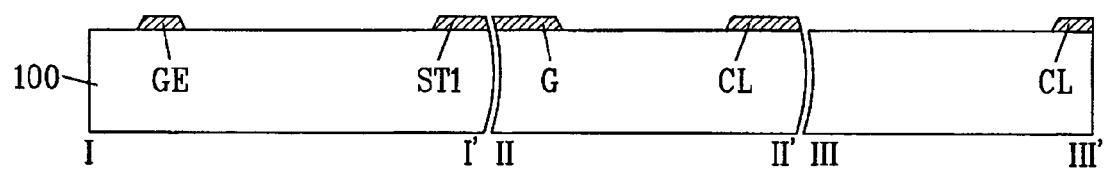
FIG. 8A to FIG. 8G are cross sectional views for explaining the fabrication process steps of a thin film transistor and an electrostatic prevention circuit in an LCD device along I-I', II-II', and III-III' according to the first embodiment of the present invention.

First, the substrate 100 having the display area 121 and the non-display area 122 is prepared, wherein the display area 121 has a plurality pixel regions P. Then, as shown in FIG. 8A, a metal layer is deposited on the entire surface of the substrate 100, and is selectively patterned by photolithography, thereby forming a plurality of gate lines G, a gate electrode GE, a first storage electrode ST1, and the common voltage line CL, at the same time (a first mask). At this time, the gate lines G are arranged along the first direction on the display area 121 of the substrate 100. Also, the gate electrode GE is formed as one with the gate line G, and the gate electrode GE protrudes from the gate line G toward the pixel region P. Simultaneously, the common voltage line CL is formed in shape of 'L' on the non-display area 122. Herein, the first storage electrode ST1 is a part of the gate line G in the adjacent pixel region P.

Figure 8B:
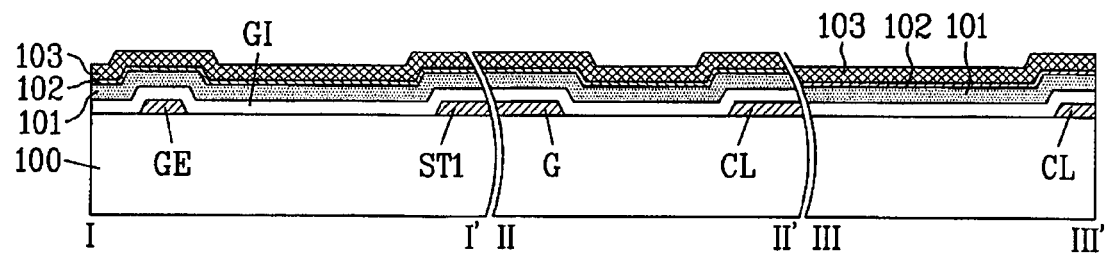

Next, as shown in FIG. 8B, a gate insulating layer GI of an insulating material such as silicon oxide (SiO) or silicon nitride $(SiN)_x$, a semiconductor material 101 of intrinsic amorphous silicon, a doped semiconductor material 102 of amorphous silicon with dopants, and a metal layer 103 of chrome (Cr) or molybdenum (Mo) are sequentially deposited on the entire surface of the substrate 100 including the gate line G, the gate electrode GE, and the common voltage line CL.

Figure 8C:
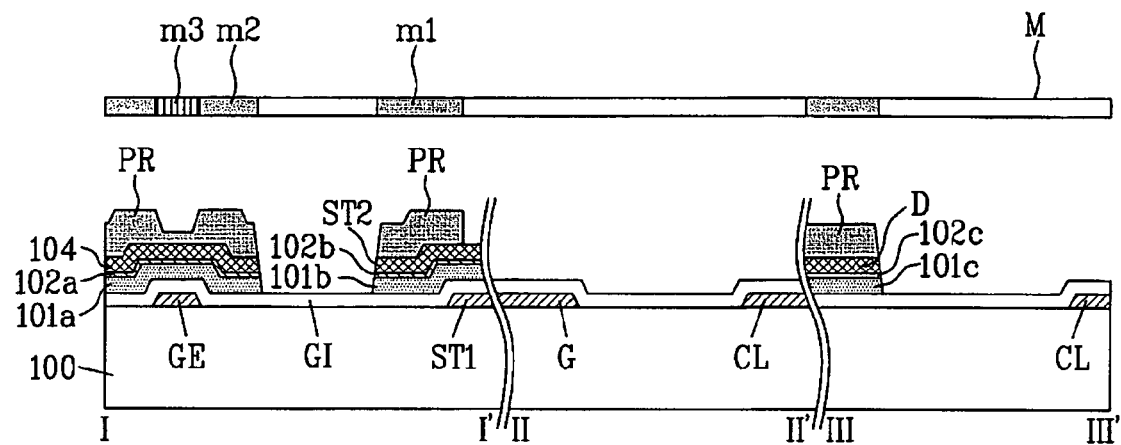

Then, as shown in FIG. 8C, a photoresist PR is coated on the entire surface of the substrate 100 including the metal layer 103, and is patterned by selective exposure with a diffraction mask (M) and development. At this time, the diffraction mask M includes an open part m1 penetrating light, a closed part m2 cutting off the light, and a diffraction part m3 comprised of a slit allowing to pass a part of the light and cutting off a part of the light. The diffraction part m3 corresponds to the channel region of the thin film transistor T.

When performing the exposure and development process to the photoresist PR by irradiating ultraviolet ray through the diffraction mask M, the photoresist PR corresponding to the open part m1 is removed, the photoresist PR corresponding to the closed part m2 remains as it is, and the photoresist PR corresponding to the diffraction part m3 is removed at a predetermined thickness.

Generally, the photoresist PR corresponding to the diffraction part m3 is formed to have a half of the initial thickness.

Subsequently, the exposed metal layer 103, the doped semiconductor material 102, and the semiconductor material 101 are removed by the etching process using the patterned photoresist PR as a mask. As a result, a first semiconductor layer 101a, a first ohmic contact layer 102a, and a source/drain metal layer 104 are formed on the gate insulating layer GI above the gate electrode GE. Also, a second semiconductor layer 101b, a second ohmic contact layer 102b, and a second storage electrode ST2 are formed on the gate insulating layer GI above the first storage electrode ST1. Simultaneously, the plurality of data lines D are formed in perpendicular to the gate lines G on the substrate 100, and a third ohmic contact layer 102c and a third semiconductor layer 101c are formed between the data line D and the gate insulating layer GI (a second mask).

Figure 8D:
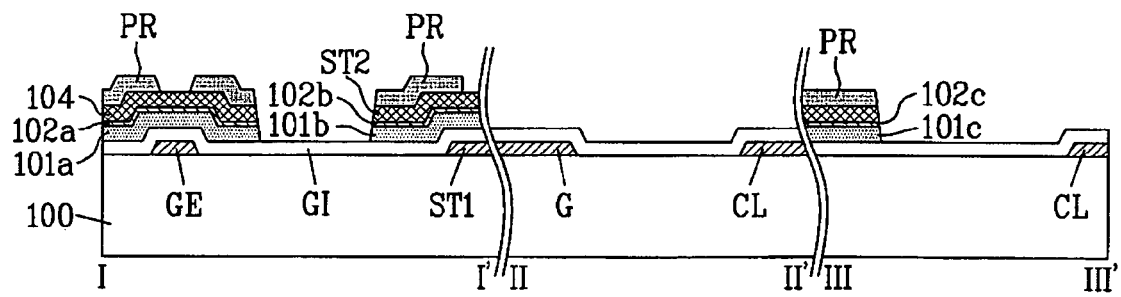

Then, as shown in FIG. 8D, the patterned photoresist PR is ashed by a plasma process.

The entire surface of the patterned photoresist PR is ashed at the same level by the ashing step. At this time, the photoresist PR corresponding to the diffraction part m3 is removed because the photoresist PR corresponding to the diffraction part m3 has less thickness for the other parts of the photoresist PR. Thus, the source/drain metal layer 104 corresponding to the diffraction part m3 is exposed.

Figure 8E:
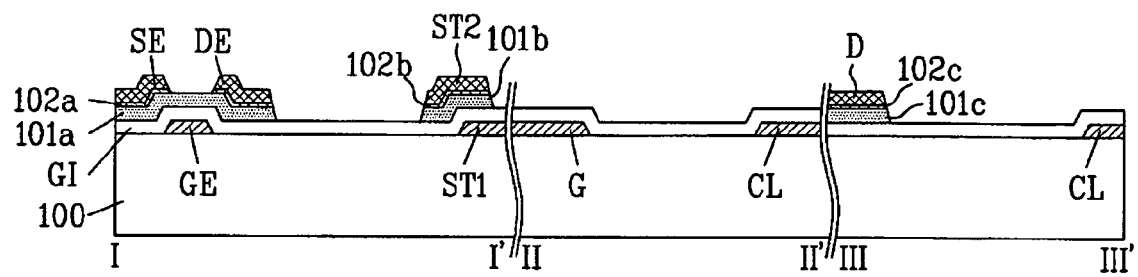

Subsequently, the exposed source/drain metal layer 104, and the first ohmic contact layer 102a formed under the source/drain metal layer 104 are simultaneously etched by using the photoresist PR remaining after the ashing step as a mask. Accordingly, as shown in FIG. 8E, a channel region is formed by exposure of the first semiconductor layer 101a. At this time, a source electrode SE overlapping one edge of the first semiconductor layer 101a, and a drain electrode DE overlapping the other edge of the first semiconductor layer 101a are formed as the source/drain metal layer 104 separates.

Figure 8F:
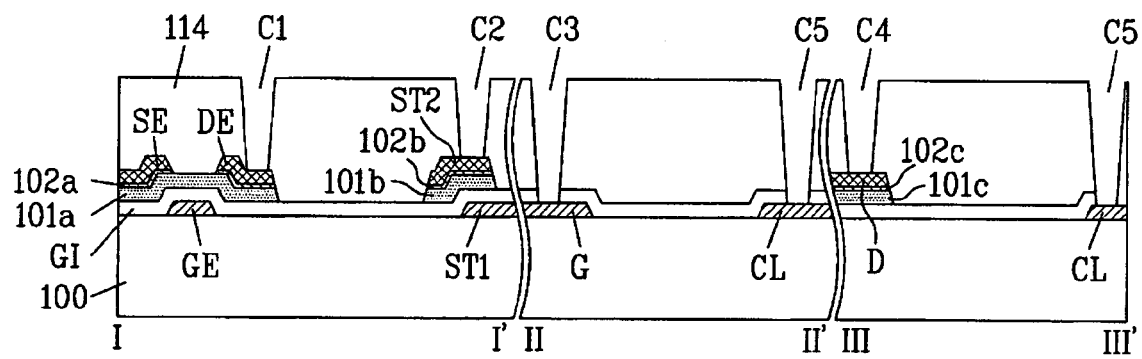

After removing the remaining photoresist PR, as shown in FIG. 8F, a passivation layer 114 of organic insulating material is deposited on the entire surface of the substrate 100 including the source electrode SE, the drain electrode DE, the data line D, and the second storage electrode ST2. Then, the passivation layer 114 and the gate insulating layer GI are selectively removed by photolithography, thereby forming a drain contact hole C1, a storage contact hole C2, a data contact hole C4, a gate contact hole C3, and a common contact hole C5 (a third mask). At this time, the drain contact hole C1 exposes some of the drain electrode DE, the storage contact hole C2 exposes some of the second storage electrode ST2, and the data contact hole C4 exposes a part of one end of the data line D. Also, the gate contact hole C3 exposes a part of one end of the gate line G, and the common contact hole C5 exposes some of the common voltage line CL. Meanwhile, the passivation layer 114 may be formed of an inorganic material such as silicon oxide ($SiO_x$) or silicon nitride ($SiN_x$,) as well as an organic insulating material.

Figure 8G:
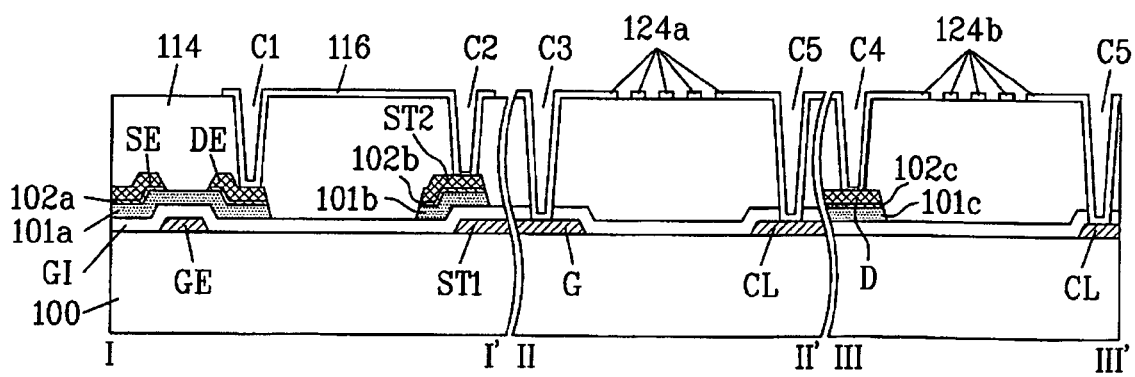

After that, as shown in FIG. 8G, a transparent conductive layer is deposited on the entire surface of the passivation layer 114, and then is selectively patterned by photolithography, thereby forming the pixel electrode 116, the first electrostatic prevention pattern 124a, and the second electrostatic prevention pattern 124b, at the same time (a fourth mask). At this time, the pixel electrode 116 is formed in the pixel region P, wherein the pixel electrode 116 is connected with the drain electrode DE and the second storage electrode ST2 through the drain contact hole C1 and the storage contact hole C2. Also, the first electrostatic prevention pattern 124a connects the end of the gate line G with the common voltage line CL through the gate contact hole C3 and the common contact hole C5. Then, the second electrostatic prevention pattern 124b connects the end of the data line D with the common voltage line CL through the data contact hole C4 and the common contact hole C5. At this time, the first and second electrostatic prevention patterns 124a and 124b are formed in s zigzag type. In FIG. 8G, it can be shown that each of the first and second electrostatic prevention patterns 124a and 124b is formed in a discontinued structure. In fact, as shown in FIG. 6, each of the first and second electrostatic prevention patterns 124a and 124b is formed in a continued structure of the zigzag type.

Meanwhile, the metal layer 103 of FIG. 8B may have a dual structure.

Figure 9:
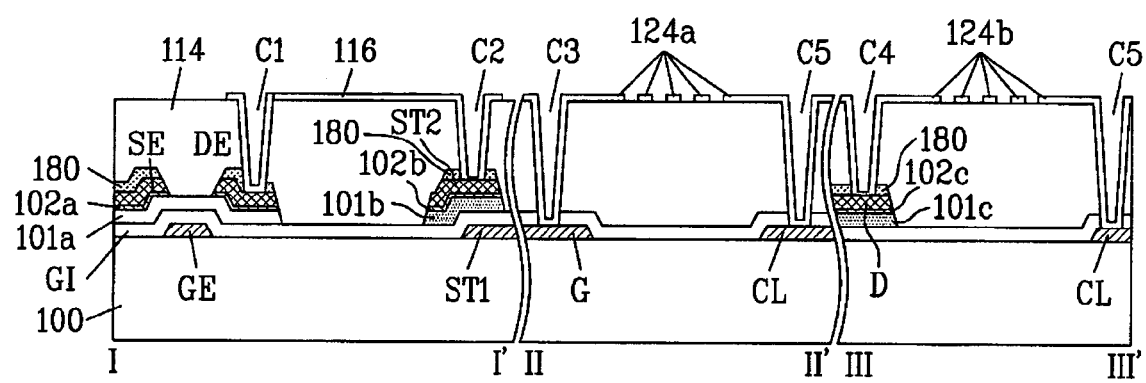
FIG. 9 is a cross-sectional view for explaining a data line having a molybdenum layer, source/drain electrodes, and a second storage electrode.

FIG. 9 is a cross-sectional view for explaining the data line, the source/drain electrodes, and the second storage electrode having a molybdenum layer.

That is, the metal layer 103 may be formed in a dual structure of an aluminum neodymium layer and a molybdenum layer 180. Accordingly, in case of performing the process of FIG. 8A to FIG. 8G with the dual metal layer 103, the data line, the source/drain electrodes SE/DE, and the second storage electrode ST2 are formed of the aluminum neodymium layer. Meanwhile, upper parts of the data line D, the source/drain electrodes SE/DE, and the second storage electrode ST2 are formed of the molybdenum layer 180. In this respect, when the metal layer of the dual structure is used, it is necessary to additionally perform the process for etching the molybdenum layer 180. That is, by selectively etching the passivation layer 114 in the same process as that of FIG. 8F, the molybdenum layer 180 is exposed, and then the exposed molybdenum layer 180 is etched, whereby it is possible to expose the end of the data line D, the drain electrode DE, and the second storage electrode ST2.

After that, as shown in FIG. 9, the transparent conductive layer is deposited on the entire surface of the passivation layer 114, and then is patterned by photolithography, thereby forming the pixel electrode 116, the first electrostatic prevention pattern 124a, and the second electrostatic prevention pattern 124b, at the same time. At this time, the pixel electrode 116 is formed in the pixel region P, wherein the pixel electrode 116 is connected with the drain electrode DE and the second storage electrode ST2 through the drain contact hole C1 and the storage contact hole C2. Also, the first electrostatic prevention pattern 124a connects the end of the gate line G with the common voltage line CL through the gate contact hole C3 and the common contact hole C5. Then, the second electrostatic prevention pattern 124b connects the end of the data line D with the common voltage line CL through the data contact hole C4 and the common contact hole C5. At this time, the pixel electrode 116 is connected with the drain electrode DE and the second storage electrode ST2 by penetrating the molybdenum layer 180. Also, the second electrostatic prevention pattern 124b is connected with the end of the data line D by penetrating the molybdenum layer 180. Accordingly, the pixel electrode 116 is connected with the drain electrode DE and the second storage electrode ST2, simultaneously, is connected with the inside wall of the penetrated molybdenum layer 180. Also, the second electrostatic prevention pattern 124b is connected with the end of the data line D, simultaneously, is connected with the inside wall of the penetrated molybdenum layer 180.

Meanwhile, the thin film transistor T comprised of the gate electrode GE, the source electrode SE and the drain electrode DE, the first electrostatic prevention pattern 124a, and the second electrostatic prevention pattern 124b may be formed in the 3-mask process using a diffraction exposure method and a lift-off method. This will be described as follows.

Figure 10:
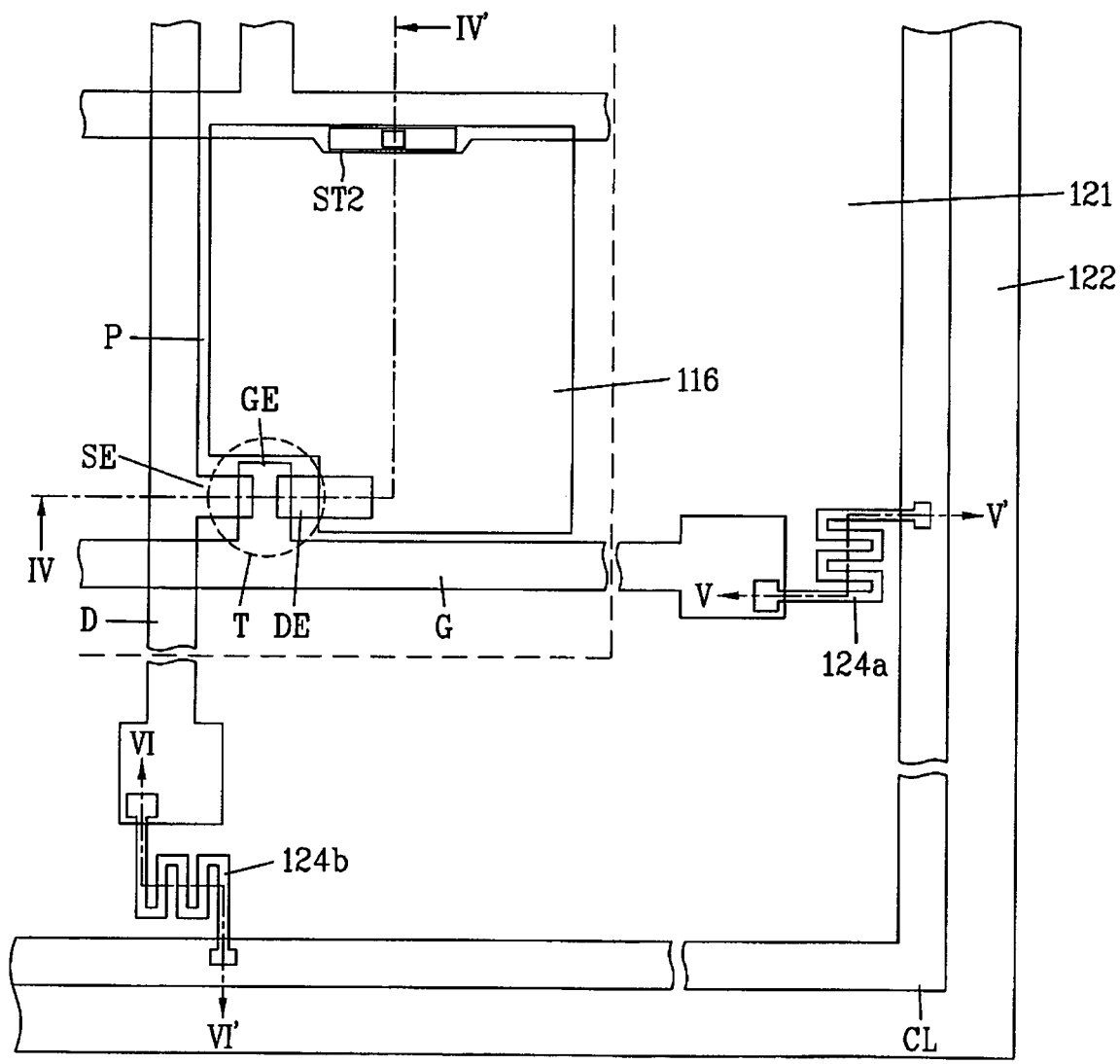
FIG. 10 is a schematic view of portion 'B' in FIG. 5 according to a second embodiment of the present invention.

FIG. 10 is a schematic view of portion 'B' in FIG. 5 according to the second embodiment of the present invention.

As shown in FIG. 5 to FIG. 10, a substrate (TFT array substrate) 100 of an LCD device according to the second embodiment of the present invention includes a plurality of data lines D arranged along a first direction on the substrate 100, each data line D having a deposition structure of a semiconductor layer (not shown) and a metal layer (not shown), a plurality of gate lines G arranged along a second direction in perpendicular to the data lines D of the substrate 100, to define a plurality of pixel regions P of a display area 121 of the substrate 100, a pixel electrode 116 formed in the pixel region, a common voltage line CL formed in a non-display area 122 surrounding the display area 121, a first electrostatic prevention pattern 124a electrically connected between the gate line G and the common voltage line CL, a second electrostatic prevention pattern 124b electrically connected between the data line D and the common voltage line CL, and a passivation layer (not shown) formed on the entire surface of the substrate 100 except for the pixel electrode 116, the first electrostatic prevention pattern 124a, and the second electrostatic prevention pattern 124b.

Also, a thin film transistor T is formed at a crossing portion of the gate line G and the data line D of the substrate 100. At this time, the pixel electrode 116 is formed in the pixel region P, wherein the pixel electrode 116 receives a data voltage from the data line D when the thin film transistor T is turned-on.

Although not shown, another substrate (color filter array substrate) is provided above the substrate 100, wherein the two substrates are opposite to each other. The substrate (color filter array substrate) has the same structure as that in the first embodiment of the present invention. Also, the first and second electrostatic prevention patterns 124a, 124b have the same structure as those in the first embodiment of the present invention.

A method for fabricating the LCD device according to the second embodiment of the present invention will be described with reference to the accompanying drawings.

FIG. 11A to FIG. 11I are cross sectional views for explaining the fabrication process steps of a thin film transistor and an electrostatic prevention circuit in an LCD device along IV-IV', V-V', and VI-VI' according to the second embodiment of the present invention.

Figure 11A:
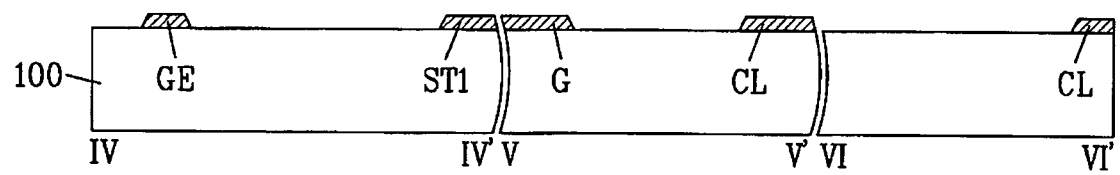
FIG. 11A to FIG. 11I are cross sectional views for explaining the fabrication process steps of a thin film transistor and an electrostatic prevention circuit in an LCD device along IV-IV', V-V', and VI-VI' according to the second embodiment of the present invention.

First, the substrate 100 having the display area 121 and the non-display area 122 is prepared, wherein the display area 121 has the plurality pixel regions P. Then, as shown in FIG. 11A, a metal layer is deposited on the entire surface of the substrate 100, and is selectively patterned by photolithography, thereby forming the plurality of gate lines G, a gate electrode GE, a first storage electrode ST1, and the common voltage line CL, at the same time (a first mask). At this time, the gate lines G are arranged along the first direction on the display area 121 of the substrate 100. Also, the gate electrode GE is formed as one with the gate line G, and the gate electrode GE protrudes from the gate line G toward the pixel region P. Simultaneously, the common voltage line CL is formed in shape of 'L' on the non-display area 122. At this time, the first storage electrode ST1 is a part of the gate line G in the adjacent pixel region P.

Figure 11B:
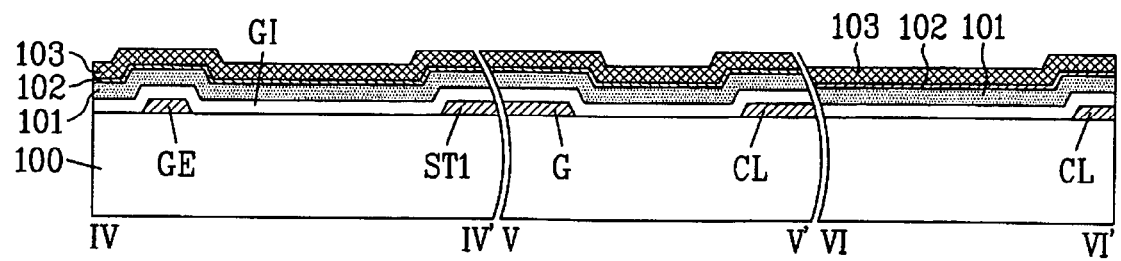

Next, as shown in FIG. 11B, a gate insulating layer GI of an insulating material such as silicon oxide ($SiO_x$) or silicon nitride ($SiN_x$) a semiconductor material 101 of genuine amorphous silicon, a doped semiconductor material 102 of amorphous silicon with impurity, and a metal layer 103 of chrome (Cr) or molybdenum (Mo) are sequentially deposited on the entire surface of the substrate 100 including the gate line G, the gate electrode GE, and the common voltage line CL.

Figure 11C:
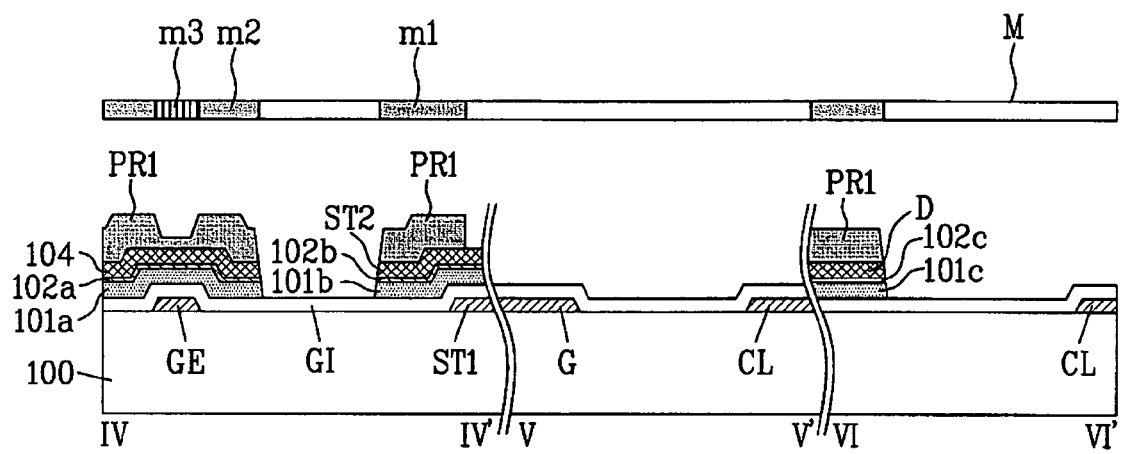

Then, as shown in FIG. 11C, a first photoresist PR1 is coated on the entire surface of the substrate 100 including the metal layer 103, and is patterned by selective exposure with a diffraction mask (M) and development. At this time, the diffraction mask M includes an open part m1 for the passing light, a closed part m2 for cutting off the light, and a diffraction part m3 comprised of a slit allowing to pass a part of the light and cutting off a part of the light. The diffraction part m3 corresponds to the channel region of the thin film transistor T.

When performing the exposure and development process to the first photoresist PR1 by irradiating ultraviolet ray through the diffraction mask M, the first photoresist PR1 corresponding to the open part m1 is removed, the first photoresist PR1 corresponding to the closed part m2 remains as it is, and the first photoresist PR1 corresponding to the diffraction part m3 is removed at a predetermined thickness.

Generally, the first photoresist PR1 corresponding to the diffraction part m3 is formed to have a half of the initial thickness.

Subsequently, the exposed metal layer 103, the doped semiconductor material 102, and the semiconductor material 101 are removed by the etching process using the patterned first photoresist PR1 as a mask. As a result, a first semiconductor layer 101a, a first ohmic contact layer 102a, and a source/drain metal layer 104 are formed on the gate insulating layer GI above the gate electrode GE. Also, a second semiconductor layer 101b, a second ohmic contact layer 102b, and a second storage electrode ST2 are formed on the gate insulating layer GI above the first storage electrode ST1. Simultaneously, the plurality of data lines D are formed in perpendicular to the gate lines G on the substrate 100. Also, a third ohmic contact layer 102c and a third semiconductor layer 101c are sequentially formed between the data line D and the gate insulating layer GI (a second mask).

Figure 11D:
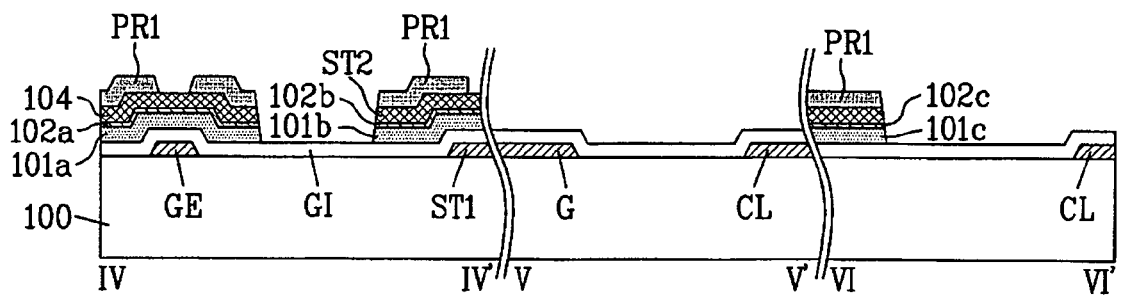

Then, as shown in FIG. 11D, the patterned first photoresist PR1 is ashed by a plasma process.

The entire surface of the patterned first photoresist PR1 is ashed at the same level by the ashing step. At this time, the first photoresist PR1 corresponding to the diffraction part m3 is removed because the first photoresist PR1 corresponding to the diffraction part m3 has less thickness for the other part of the first photoresist PR1. Accordingly, the source/drain metal layer 104 corresponding to the diffraction part m3 is exposed.

Figure 11E:
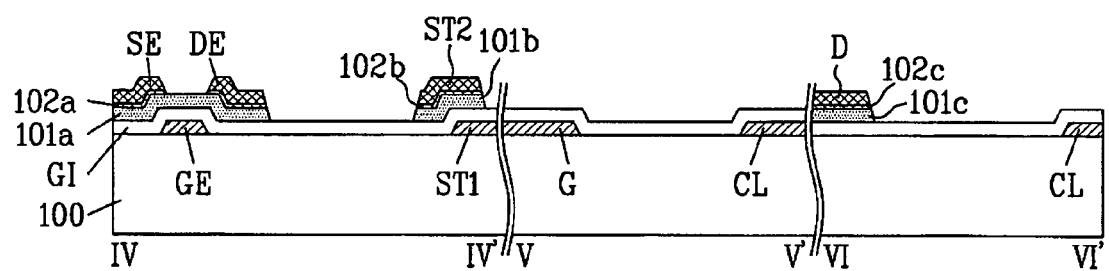

Then, the exposed source/drain metal layer 104, and the first ohmic contact layer 102a formed under the source/drain metal layer 104 are simultaneously etched by using the first photoresist PR1 remaining after the ashing step as the mask. Accordingly, as shown in FIG. 11E, a channel region is formed by exposure of the first semiconductor layer 101a. At this time, a source electrode SE overlapping one edge of the first semiconductor layer 101a, and a drain electrode DE overlapping the other edge of the first semiconductor layer 101a are formed as the source/drain metal layer 104 separates.

Figure 11F:
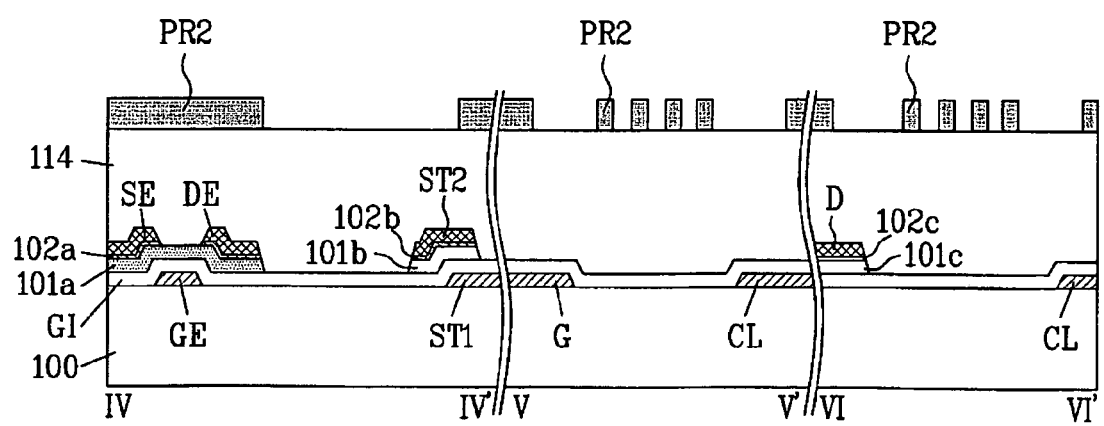

Referring to FIG. 11F, after removing the remaining first photoresist PR1, the passivation layer 114 of organic insulating material is deposited on the entire surface of the substrate 100 including the gate electrode GE, the source electrode SE, the drain electrode DE, the data line D, and the second storage electrode ST2. Then, a second photoresist PR2 is formed on the entire surface of the substrate 100 including the passivation layer 114. After that, the second photoresist PR2 is patterned by selective exposure and development (a third mask).

Figure 11G:
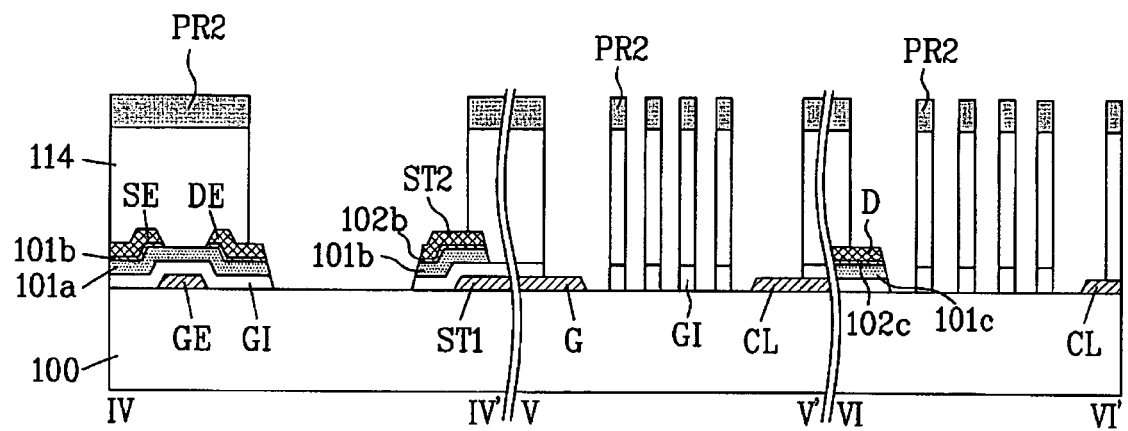

Thereafter, as shown in FIG. 11G, the passivation layer 114 and the gate insulating layer GI are sequentially etched by using the patterned second photoresist PR2 as a mask, thereby exposing the drain electrode DE, the pixel region P, the second storage electrode ST2, the common voltage line CL, the end of the gate line G, and the end of the data line D. At this time, the gate insulating layer GI formed in the pixel region P, the gate insulating layer GI formed on the common voltage line CL, and the gate insulating layer GI formed on the end of the gate line G are removed.

Figure 11H:
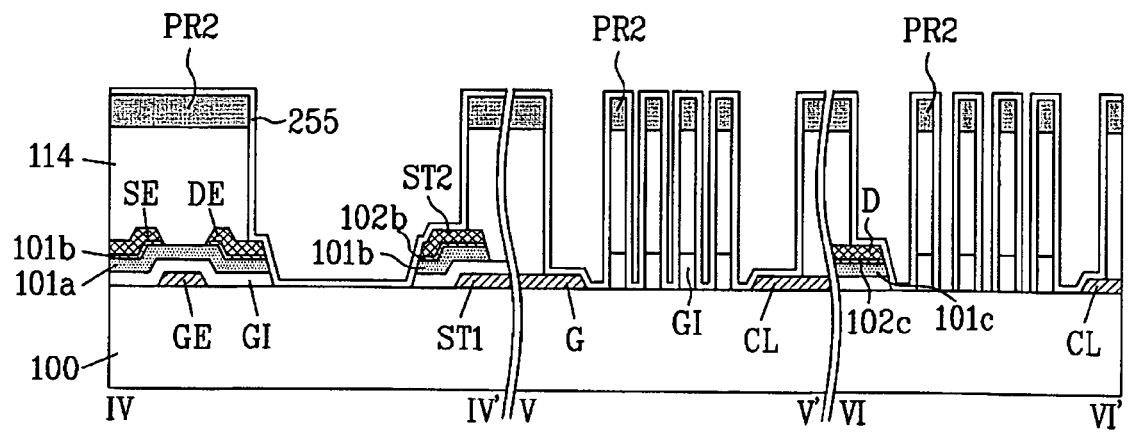
Figure 11I:
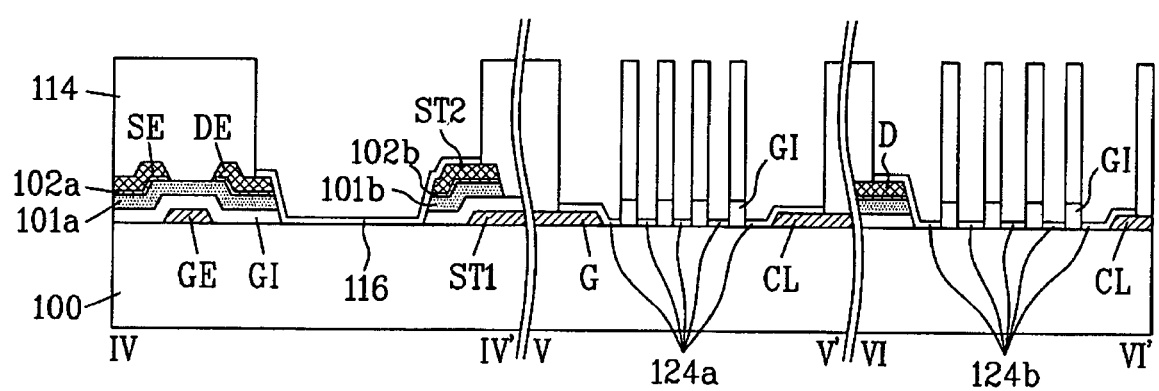

Next, as shown in FIG. 11H, a transparent conductive layer is deposited on the entire surface of the substrate 100 including the patterned second photoresist PR2. After that, the patterned second photoresist PR2 is removed by a stripper. At this time, as shown in FIG. 11I, the transparent conductive layer corresponding to the patterned second photoresist PR2 is separated together with the patterned second photoresist PR2. As a result, the separated transparent conductive layer is melted by the stripper, and then is removed. That is, the transparent conductive layer selectively remains on the drain electrode DE, the pixel region P, the second storage electrode ST2, the common voltage line CL, the end of the gate line G, and the end of the data line D.

Accordingly, the pixel electrode 116 is formed in the pixel region P, wherein the pixel electrode 116 is connected with the drain electrode DE and the second storage electrode ST2. Simultaneously, the first electrostatic prevention pattern 124a connects the end of the gate line G with the common voltage line CL, and the second electrostatic prevention pattern 124b connects the end of the data line D with the common voltage line CL.

At this time, as shown in FIG. 11F to FIG. 11I, the pixel electrode 116, the first electrostatic prevention pattern 124a, and the second electrostatic prevention pattern 124b are formed by the lift-off method.

As mentioned above, the LCD device according to the present invention and the method for fabricating the same have the following advantages.

In the LCD device according to the present invention, the plurality of first and second electrostatic prevention patterns are formed of the transparent conductive layer in the zigzag type, so as to protect the inner components of the LCD device from the external static electricity. Accordingly, it is not required to have the complicated structure for the transistor having the channel region according to the related art. That is, the first and second electrostatic prevention patterns of the LCD device according to the present invention may be fabricated in the 4-mask or 3-mask process using the diffraction exposure method.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device comprising:
a substrate having a display area and a non-display area;
a data line disposed along a first direction on the substrate and having a metal layer and a semiconductor layer;
a gate line disposed along a second direction crossing the data line, defining a pixel region;
a common voltage line on the non-display area;
pixel electrodes at each pixel region;
a first electrostatic prevention pattern electrically connected between the gate line and the common voltage line;
a second electrostatic prevention pattern electrically connected between the data line and the common voltage line; and
a molybdenum layer on the data line.

2. The LCD device of claim 1, wherein the first electrostatic prevention pattern is longer than the shortest distance between the gate line and the common voltage line, and the second electrostatic prevention pattern is longer than the shortest distance between the data line and the common voltage line.

3. The LCD device of claim 2, wherein the first and second electrostatic prevention patterns are formed in any one shape of zigzag type, chevron type, notch type, 'ㄹ' type, 'S' type, 'Z' type, and saw-tooth type.

4. The LCD device of claim 1, wherein the pixel electrode, the first electrostatic prevention pattern, and the second electrostatic prevention pattern are formed of the same material.

5. The LCD device of claim 1, further comprising a thin film transistor at a crossing portion of the gate and data lines.

6. The LCD device of claim 5, further comprising a molybdenum layer on source/drain electrodes of the thin film transistor.

7. The LCD device of claim 6, wherein the pixel electrode is connected with the source electrode by penetrating the molybdenum layer.

8. The LCD device of claim 1, further comprising an ohmic contact layer between the semiconductor layer and the metal layer.

9. The LCD device of claim 1, wherein the second electrostatic prevention pattern is connected with the data line by penetrating the molybdenum layer.

10. The LCD device of claim 1, wherein the non-display area includes a plurality of gate pads to which a first end of the gate line is connected, and a plurality data pads to which one end of the data line is connected.

11. The LCD device of claim 10, wherein the first electrostatic prevention pattern is connected with a second end of the gate line, and the second electrostatic prevention pattern is connected with a second end of the data line.

12. A liquid crystal display (LCD) device comprising:
a substrate having a display area and a non-display area;
a data line disposed along a first direction on the display area of the substrate and having a metal layer and a semiconductor layer;
a gate line disposed along a second direction crossing the data line, to define a pixel region;
a common voltage line on the non-display area;
pixel electrodes at each pixel region;
a first electrostatic prevention pattern electrically connected between the gate line and the common voltage line;
a second electrostatic prevention pattern electrically connected between the data line and the common voltage line;
a passivation layer formed on an entire surface of the substrate except for the pixel electrode, the first electrostatic prevention pattern, and the second electrostatic prevention pattern; and a molybdenum layer on the data line.

13. The LCD device of claim 12, wherein the first electrostatic prevention pattern is longer than the shortest distance between the gate line and the common voltage line, and the second electrostatic prevention pattern is longer than the shortest distance between the data line and the common voltage line.

14. The LCD device of claim 13, wherein the first and second electrostatic prevention patterns are formed in any one shape of zigzag type, chevron type, notch type, 'ㄹ' type, 'S' type, 'Z' type, and saw-tooth type.

15. The LCD device of claim 12, wherein the pixel electrode, the first electrostatic prevention pattern, and the second electrostatic prevention pattern are formed of the same material.

16. The LCD device of claim 12, further comprising a thin film transistor at a crossing portion of the gate and data lines.

17. The LCD device of claim 16, further comprising a molybdenum layer on source/drain electrodes of the thin film transistor.

18. The LCD device of claim 17, wherein the pixel electrode is connected with the source electrode by penetrating the molybdenum layer.

19. The LCD device of claim 12, further comprising an ohmic contact layer between the semiconductor layer and the metal layer.

20. The LCD device of claim 12, wherein the second electrostatic prevention pattern is connected with the data line by penetrating the molybdenum layer.

21. The LCD device of claim 12, wherein the non-display area includes a plurality of gate pads to which a first of the gate line is connected, and a plurality data pads to which a first end of the data line is connected.

22. The LCD device of claim 21, wherein the first electrostatic prevention pattern is connected with a second end of the gate line, and the second electrostatic prevention pattern is connected with a second end of the data line.

* * * * *